(12) United States Patent
Oh et al.

(10) Patent No.: US 10,498,989 B1
(45) Date of Patent: Dec. 3, 2019

(54) DIGITAL DOUBLE SAMPLING CIRCUIT

(71) Applicant: Himax Imaging Limited, Tainan (TW)

(72) Inventors: Hack Soo Oh, Tainan (TW);
Youngchul Sohn, Tainan (TW);
Kwangoh Kim, Tainan (TW)

(73) Assignee: Himax Imaging Limited, Tainan (TW)

( * ) Notice: Subject to any disclaimer, the term of this patent is extended or adjusted under 35 U.S.C. 154(b) by 0 days.

(21) Appl. No.: 16/178,381

(22) Filed: Nov. 1, 2018

(51) Int. Cl.
*H04N 5/365* (2011.01)
*H04N 5/374* (2011.01)
*H04N 5/378* (2011.01)

(52) U.S. Cl.
CPC ........... *H04N 5/3658* (2013.01); *H04N 5/374* (2013.01); *H04N 5/378* (2013.01)

(58) Field of Classification Search
CPC .................................................... H04N 5/3658
See application file for complete search history.

(56) References Cited

U.S. PATENT DOCUMENTS

| | | | | |
|---|---|---|---|---|
| 5,332,931 A * | 7/1994 | Crispie | ............. | G01R 19/0038 327/55 |
| 5,781,312 A * | 7/1998 | Noda | ................... | H04N 5/3575 348/272 |
| 7,145,494 B2 * | 12/2006 | Mizuguchi | .......... | H03M 1/0607 341/155 |
| 7,948,540 B2 * | 5/2011 | Ogura | ................... | H04N 5/3575 348/300 |
| 9,264,643 B1 * | 2/2016 | Xue | ...................... | H04N 5/3575 |
| 2004/0027471 A1 * | 2/2004 | Koseki | ................. | H04N 5/2173 348/300 |
| 2004/0080637 A1 * | 4/2004 | Nakamura | ............. | H04N 5/243 348/255 |
| 2006/0001750 A1 * | 1/2006 | Mizuguchi | .......... | H03M 1/0607 348/294 |
| 2009/0167585 A1 * | 7/2009 | Yeom | ...................... | H03K 4/50 341/155 |
| 2011/0013050 A1 * | 1/2011 | Aruga | .................. | H04N 5/3598 348/241 |
| 2015/0249797 A1 * | 9/2015 | Yui | ...................... | H04N 5/3575 250/208.1 |
| 2016/0006961 A1 * | 1/2016 | Asaba | .................. | H04N 5/3692 358/482 |
| 2016/0165166 A1 * | 6/2016 | Koh | ..................... | H04N 5/3575 348/302 |

(Continued)

*Primary Examiner* — Cynthia Segura
(74) *Attorney, Agent, or Firm* — Donald E. Stout; Stout, Uxa & Buyan, LLP

(57) ABSTRACT

A digital double-sampling (DDS) circuit includes a comparator with input nodes respectively connected to a ramp voltage and an image output node of a pixel circuit via a capacitor; a reset switch connected between the input nodes for resetting the capacitor; an analog-to-digital converter (ADC) coupled to receive a comparison output of the comparator, the ADC including a counter that counts while the ramp voltage is ramping, thereby generating a reset-ADC value in a reset phase and generating a signal-ADC value in a signal phase; a subtractor that subtracts the reset-ADC value from the signal-ADC value, thereby resulting in a difference value representing a sampled output; and a clamp circuit that generates a clamp voltage at the image output node. In the reset phase, the clamp circuit is disabled after the capacitor finishes resetting but before the ramp voltage begins ramping.

11 Claims, 4 Drawing Sheets

(56) References Cited

U.S. PATENT DOCUMENTS

| 2016/0219234 A1* | 7/2016 | Nishihara | H04N 5/378 |
| 2017/0201700 A1* | 7/2017 | Hashimoto | H04N 5/3575 |
| 2019/0115931 A1* | 4/2019 | Hurwitz | H04N 5/3575 |

* cited by examiner

US 10,498,989 B1

DIGITAL DOUBLE SAMPLING CIRCUIT

BACKGROUND OF THE INVENTION

1. Field of the Invention

The present invention generally relates to digital double sampling (DDS), and more particularly to a DDS circuit with dark-sun prevention scheme adaptable to an image sensor.

2. Description of Related Art

Digital double sampling (DDS) is a scheme commonly used to cancel read-out path offset and comparator delay variation when reading out photodiode information of an image sensor such as a complementary metal-oxide-semiconductor (CMOS) image sensor.

When taking a picture of sun light, the sun image may ordinarily become dark due to electron overflow of the photodiode. A clamp scheme is thus proposed to clamp an image output node of a pixel circuit at a certain level during the reset phase. However, the clamp scheme may disadvantageously affect the signal transfer from the photodiode to the image output node during the reset phase in case of no sun-light or low-light condition, and column fixed pattern noise (CFPN) may therefore occur.

For the reason that conventional clamp scheme could not effectively solve the sun-light phenomenon in the DDS system, a need has thus arisen to propose a novel scheme to overcome drawbacks of the conventional DDS system.

SUMMARY OF THE INVENTION

In view of the foregoing, it is an object of the embodiment of the present invention to provide a digital double-sampling (DDS) circuit capable of preventing dark-sun condition and column fixed pattern noise (CFPN).

According to one embodiment, a digital double-sampling (DDS) circuit includes a pixel circuit of an image sensor, a comparator, a reset switch, an analog-to-digital converter (ADC), a subtractor and a clamp circuit. The comparator has a first input node connected to a ramp voltage and a second input node connected to an image output node of the pixel circuit via a capacitor. The reset switch is connected between the first input node and the second input node for resetting the capacitor. The ADC is coupled to receive a comparison output of the comparator, the ADC including a counter that counts while the ramp voltage is ramping, thereby generating a reset-ADC value in a reset phase and generating a signal-ADC value in a signal phase. The subtractor subtracts the reset-ADC value from the signal-ADC value, thereby resulting in a difference value representing a sampled output. The clamp circuit generates a clamp voltage at the image output node. In the reset phase, the clamp circuit is disabled after the capacitor finishes resetting but before the ramp voltage begins ramping.

DETAILED DESCRIPTION OF THE INVENTION

Figure 1:
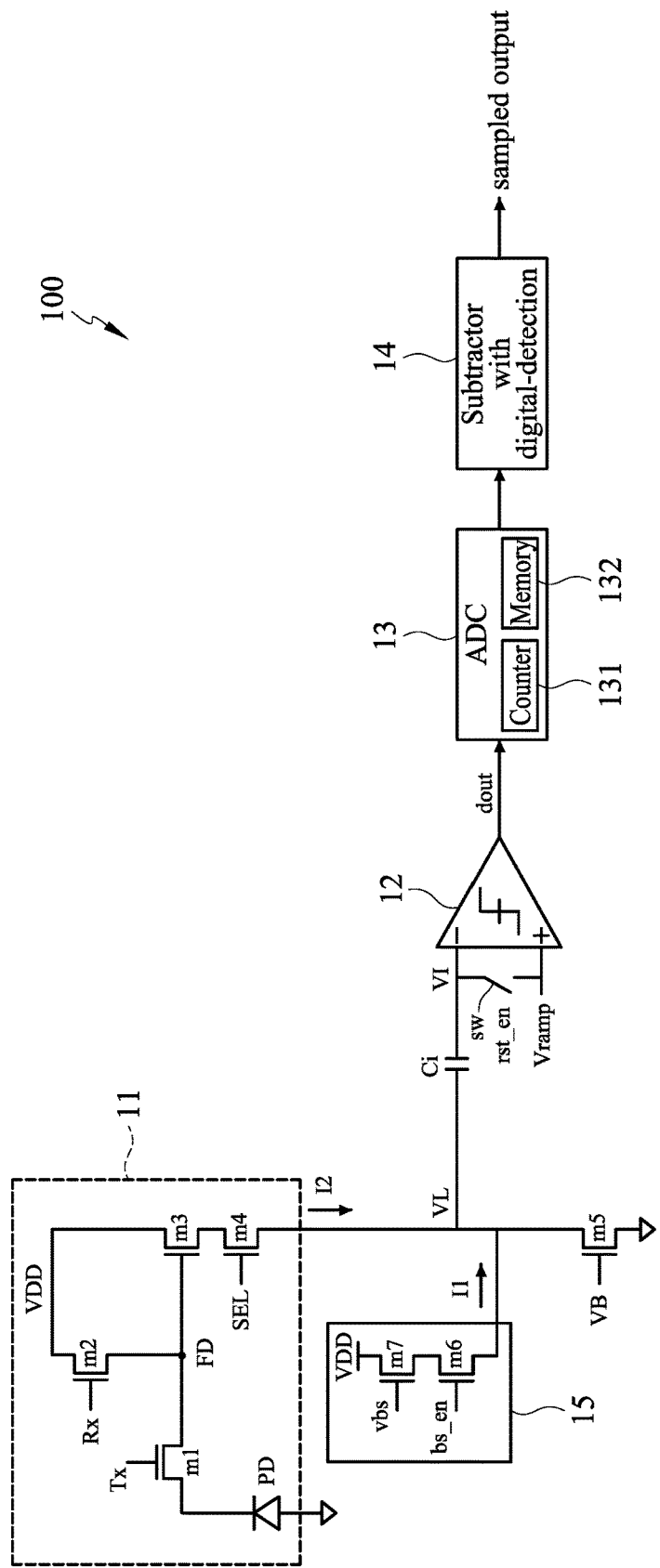
FIG. 1 shows a circuit diagram illustrating a digital double-sampling (DDS) circuit with dark-sun prevention scheme adaptable to a pixel circuit of an image sensor according to one embodiment of the present invention.

FIG. 1 shows a circuit diagram illustrating a digital double-sampling (DDS) circuit 100 with dark-sun prevention scheme adaptable to a pixel circuit 11 of an image sensor, such as a complementary metal-oxide-semiconductor (CMOS) image sensor, according to one embodiment of the present invention. Although four-transistor (4T) pixel architecture is exemplified in FIG. 1, it is appreciated that the pixel circuit 11 may have pixel architecture other than the 4T architecture.

Specifically, the pixel circuit 11 may include a transfer transistor m1, a reset transistor m2, a source follower transistor m3 and a row selection transistor m4, which may, for example, be implemented by N-type metal-oxide-semiconductor (NMOS) transistors. As exemplified in FIG. 1, a photodiode PD is connected between the transfer transistor m1 and ground. The transfer transistor m1 is connected between a floating diffusion (FD) node and the photodiode PD, and a gate of the transfer transistor m1 is connected to a transfer signal Tx. The reset transistor m2 is connected between power VDD and the FD node, and a gate of the reset transistor m2 is connected to a reset signal Rx. The source follower transistor m3 and the row selection transistor m4 are connected in series between the power VDD and an image output node VL, and gates of the source follower transistor m3 and the row selection transistor m4 are connected to the FD node and a selection signal SEL, respectively. A first bias transistor m5 may be connected between the image output node VL and the ground, and a gate of the bias transistor m5 is connected to a first bias voltage VB.

The DDS circuit 100 of the embodiment may include a comparator 12, which may, for example, be implemented by an operational amplifier. Specifically, a first input node (e.g., positive (+) input node) of the comparator 12 is connected to a ramp voltage Vramp, and a second input node (e.g., negative (−) input node VI) of the comparator 12 is connected to the image output node VL (of the pixel circuit 11) via a capacitor Ci. A reset switch SW, controlled by a reset enable signal rst_en is connected between the negative input node VI and the positive (+) input node of the comparator 12 for resetting the capacitor Ci disposed between the image output node VL the and (the negative (−) input node VI of) the comparator 12.

Figure 2:
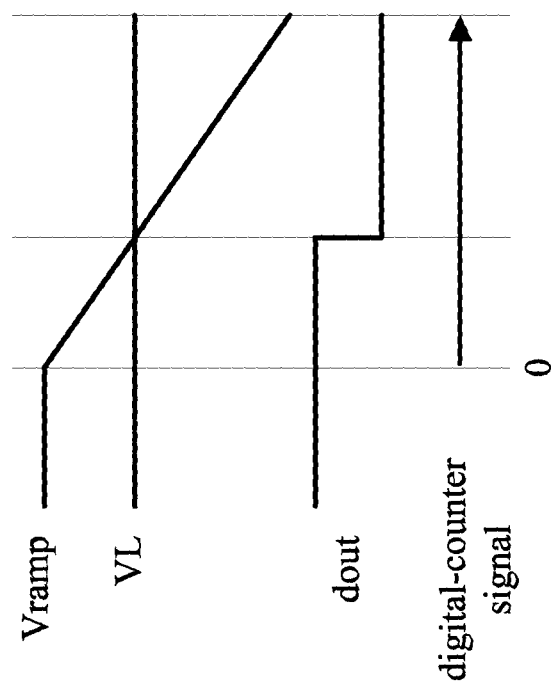
FIG. 2 shows exemplary timing diagrams of pertinent signals of the comparator and the ADC of FIG. 1.

The DDS circuit 100 of the embodiment may include an analog-to-digital converter (ADC) 13, which receives a comparison output dout of the comparator 12, and accordingly generates a digital-counter signal, by a counter 131 that counts while the ramp voltage Vramp is ramping (down). The generated digital-counter signal represents an amount of time during which the comparison output dout is asserted (e.g., high level). FIG. 2 shows exemplary timing diagrams of pertinent signals of the comparator 12 and the ADC 13 of FIG. 1. In a reset phase of the digital double-sampling performed by the DDS circuit 100, the counter 131 of the ADC 13 may use m bits to count from 0 to $2^m-1$ (e.g., 8-bit counter that counts from 0 to 255), and may generate a reset-ADC value. On the other hand, in a signal phase of the digital double-sampling performed by the DDS circuit 100, the counter 131 of the ADC 13 may use n bits (m and n are positive integers and m≤n) to count from 0 to $2^n-1$ (e.g., 10-bit counter that counts from 0 to 1023) and may generate a signal-ADC value. It is noted that the ADC 13 may include a memory 132 for temporarily storing the generated reset-ADC value and the generated signal-ADC value.

The DDS circuit 100 of the embodiment may include a subtractor with digital-detection (subtractor hereinafter) 14 configured to subtract the reset-ADC value from the signal-ADC value, thereby resulting in a difference value representing a sampled output of the photodiode signal. In the embodiment, if the reset-ADC value is equal to a maximum count (i.e., $2^m-1$) of the reset phase, indicating a sun-light condition, an output of the subtractor 14 (i.e., sampled output of the DDS circuit 100) is then set to a maximum count (i.e., $2^n-1$) of the signal phase, thereby preventing dark-sun result; otherwise the difference value is outputted as the sampled output.

The DDS circuit 100 of the embodiment may include a clamp circuit 15 that is connected between the power VDD and the image output node VL. In the embodiment, the clamp circuit 15 may include a clamp transistor m6 (e.g., NMOS transistor) configured to generate (for example, at a source thereof) a clamp voltage at the image output node VL. A gate of the clamp transistor m6 is controlled by a clamp enable signal bs_en. For example, when the clamp enable signal bs_en is asserted (e.g., high level), the clamp circuit 15 is enabled to generate the clamp voltage; otherwise, no clamp voltage is generated. The clamp circuit 15 may further include a second bias transistor m7 that is connected between the power VDD and the clamp transistor m6, and a gate of the second bias transistor m7 is connected to a second bias voltage vbs, where the second bias transistor m7 and the clamp transistor m6 are connected in series between the power VDD and the image output node VL.

Figure 3:
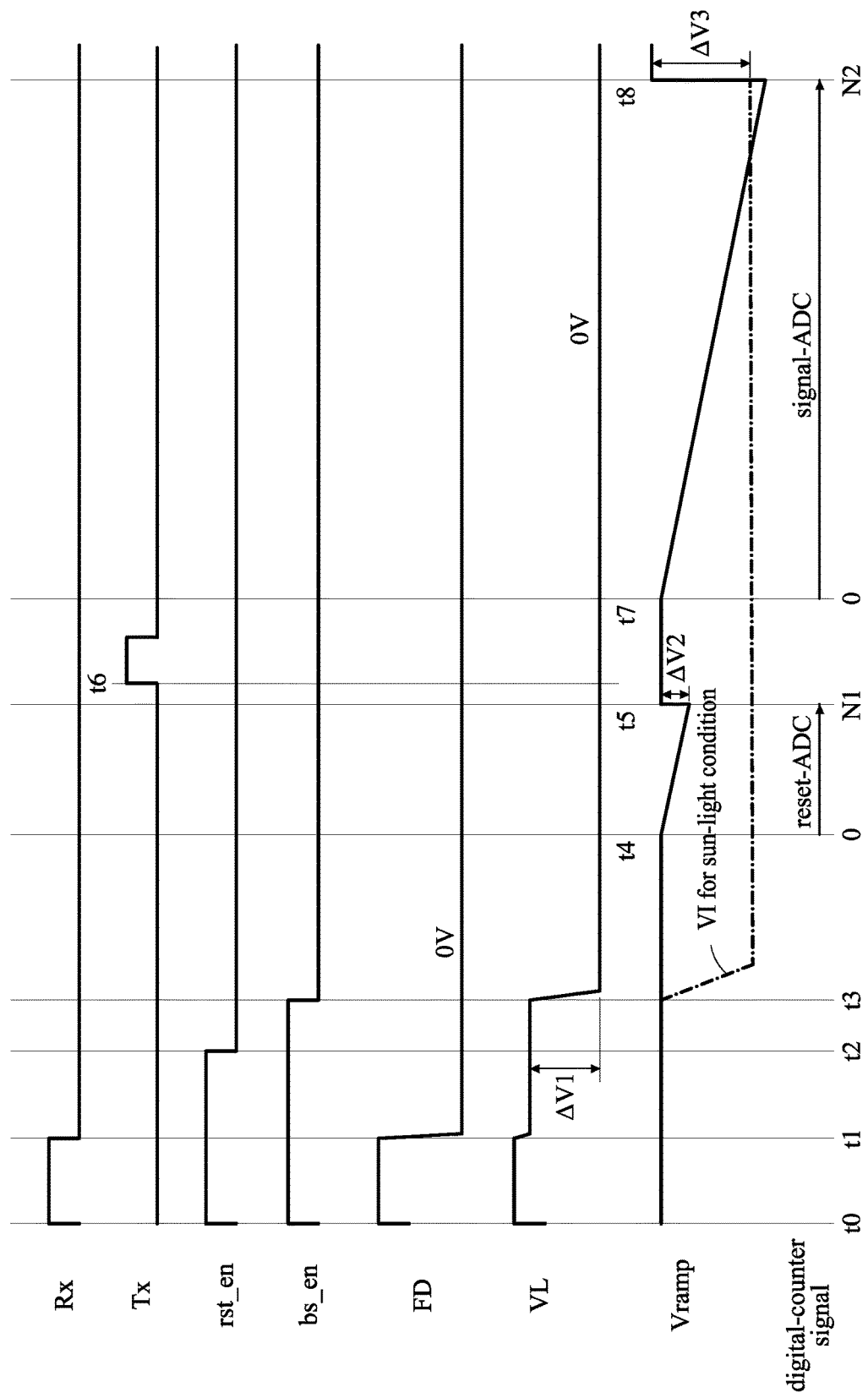
FIG. 3 shows exemplary timing diagrams of pertinent signals of the DDS circuit according to one embodiment of the present invention.

FIG. 3 shows exemplary timing diagrams of pertinent signals of the DDS circuit 100 according to one embodiment of the present invention. For better demonstrating aspect of the embodiment, only sun-light condition is shown. Specifically, in the reset phase (time period t0-t6) of the digital double-sampling performed by the DDS circuit 100, firstly the reset signal Rx, the reset enable signal rst_en and the clamp enable signal bs_en become asserted (e.g., high level) at time t0 to reset the pixel circuit 11, to reset the comparator 12, and to enable the clamp circuit 15, respectively. At time t1, the pixel circuit 11 finishes resetting when the reset signal Rx is de-asserted (e.g., low level). Accordingly, the image output node VL is clamped to the clamp voltage Δ V1 (generated by the clamp circuit 15).

At time t2, the capacitor Ci finishes resetting (by the reset switch SW) when the reset enable signal rst_en is de-asserted (e.g., low level). Subsequently, at time t3, the clamp circuit 15 is disabled when the clamp enable signal bs_en is de-asserted (e.g., low level). Therefore, the image output node VL is no longer clamped. Moreover, the image output node VL drops to 0 volt due to sun-light condition. Afterward, from time t4 to t5, the ramp voltage Vramp is ramping (down) with an amount of Δ V2 while the counter 131 of the ADC 13 counts from 0 to N1 (i.e., $2^m-1$), and the reset-ADC value is thus generated (by the ADC 13). According to one aspect of the embodiment, in the reset phase, the clamp circuit 15 is disabled (at t3) after the capacitor Ci finishes resetting (at t2) but before the ramp voltage Vramp begins ramping (at t4).

In the signal phase (time period t6-t8) of the digital double-sampling performed by the DDS circuit 100, firstly the transfer transistor m1 becomes enabled at time t6 to transfer image signal from the photodiode PD to the FD node. Afterward, from time t7 to t8, the ramp voltage Vramp is ramping (down) with an amount of Δ V3 while the counter 131 of the ADC 13 counts from 0 to N2 (i.e., $2^n-1$), and the signal-ADC value is thus generated (by the ADC 13). In one exemplary embodiment, Δ V2 is about 20% of Δ V3, and N1/N2 may be 255/1023 in case of 10-bit ADC resolution.

According to the embodiment set forth above, in the reset phase (particularly during time period t3-t6), as the clamp circuit 15 is disabled, no output current I1 (of the clamp circuit 15) flows toward the image output node VL due to unexpectedly turning on the clamp circuit 15. Accordingly, the output current I2 of the row selection transistor m4 would not be affected (e.g., be decreased), particularly in case of no sun-light or low-light condition, and column fixed pattern noise (CFPN) would not occur due to threshold voltage difference between the clamp transistor m6 and the second bias transistor m7 (of the clamp circuit 15).

Figure 4:
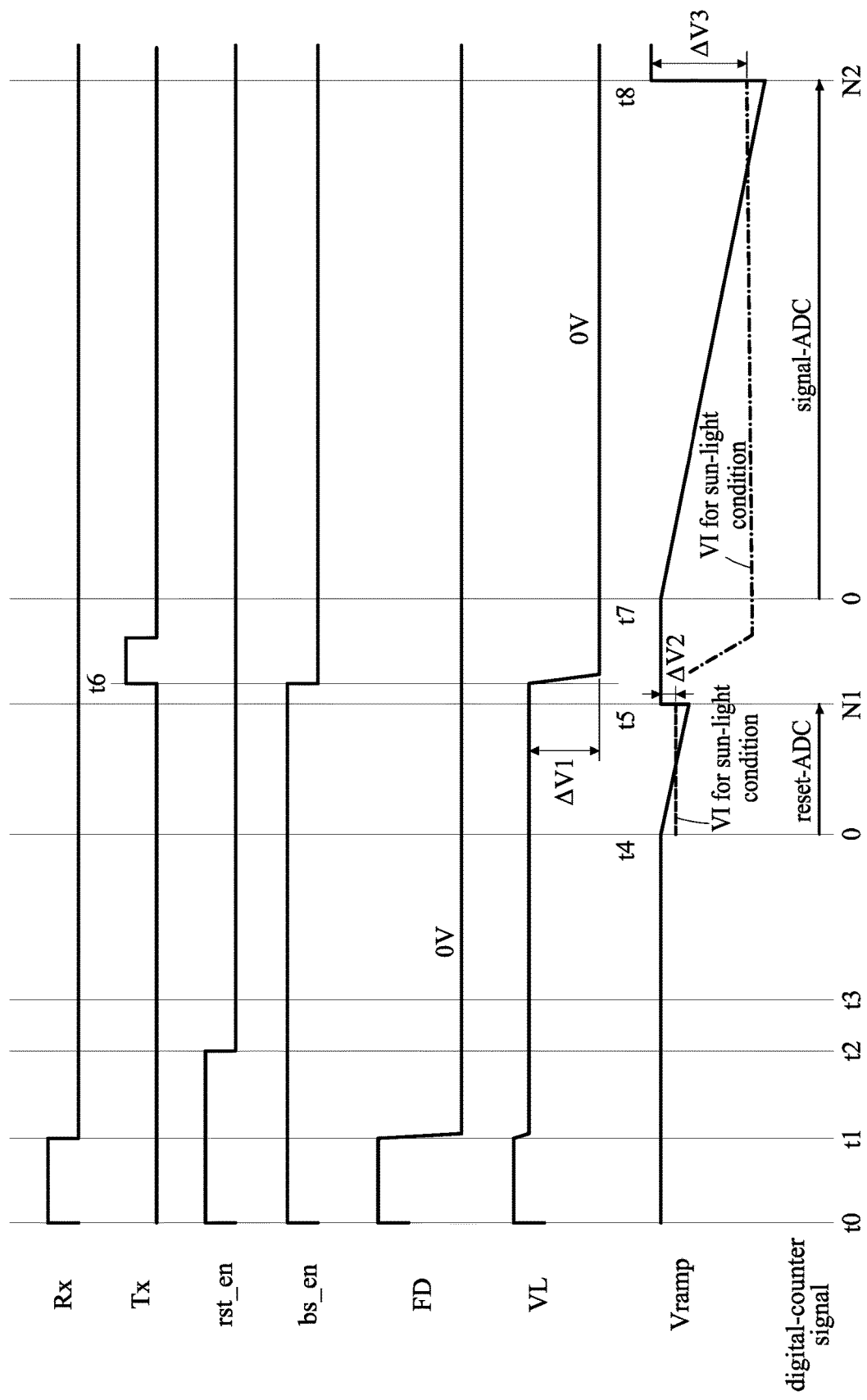
FIG. 4 shows exemplary timing diagrams of pertinent signals of the DDS circuit adopting a scheme different from the embodiment of the present invention as shown in FIG. 3.

FIG. 4 shows exemplary timing diagrams of pertinent signals of the DDS circuit 100 adopting a scheme different from the embodiment of the present invention as shown in FIG. 3, and only sun-light condition is shown. Compared to FIG. 3, the clamp circuit 15 is enabled (with asserted clamp enable signal bs_en) until the end of the reset phase. Accordingly, the image output node VL is clamped at a certain level during the reset phase. However, the clamp circuit 15 may be turned on slightly, an output current I1 (of the clamp circuit 15) thus flows toward the image output node VL. This output current I1 makes the output current I2 of the row selection transistor m4 reduced and affects the signal transfer from the photodiode PD to the image output node VL during the reset phase in case of no sun-light or low-light condition. Accordingly, column fixed pattern noise (CFPN) may occur due to threshold voltage difference between the clamp transistor m6 and the second bias transistor m7 (of the clamp circuit 15).

Although specific embodiments have been illustrated and described, it will be appreciated by those skilled in the art that various modifications may be made without departing from the scope of the present invention, which is intended to be limited solely by the appended claims.

What is claimed is:
1. A digital double-sampling (DDS) circuit, comprising:
   a pixel circuit of an image sensor;
   a comparator with a first input node connected to a ramp voltage and a second input node connected to an image output node of the pixel circuit via a capacitor;
   a reset switch connected between the first input node and the second input node for resetting the capacitor;
   an analog-to-digital converter (ADC) coupled to receive a comparison output of the comparator, the ADC including a counter that counts while the ramp voltage is ramping, thereby generating a reset-ADC value in a reset phase and generating a signal-ADC value in a signal phase;
   a subtractor that subtracts the reset-ADC value from the signal-ADC value, thereby resulting in a difference value representing a sampled output; and
   a clamp circuit that generates a clamp voltage at the image output node;
   wherein, in the reset phase, the clamp circuit is disabled after the capacitor finishes resetting but before the ramp voltage begins ramping;

wherein the following steps are performed in sequence in the reset phase:
resetting the pixel circuit, resetting the capacitor and enabling the clamp circuit, respectively;
stopping resetting the pixel circuit, thereby clamping the image output node to the clamp voltage;
stopping resetting the capacitor;
disabling the clamp circuit, thereby no longer clamping the image output node to the clamp voltage; and
ramping down the ramp voltage while the counter counts, thereby generating the reset-ADC value.

2. The DDS circuit of claim 1, wherein the comparator comprises an operational amplifier with a positive input node acting as the first input node, and a negative input node acting as the second input node.

3. The DDS circuit of claim 1, wherein the ADC comprises a memory that temporarily stores the reset-ADC value and the signal-ADC value.

4. The DDS circuit of claim 1, wherein the subtractor sets the sampled output to a maximum count of the counter of the signal phase, when the reset-ADC value is equal to a maximum count of the counter of the reset phase.

5. The DDS circuit of claim 4, wherein the subtractor outputs the difference value as the sampled output, when the reset-ADC value is less than the maximum count of the counter of the reset phase.

6. The DDS circuit of claim 5, wherein the counter counts from 0 to $2^m-1$ in the reset phase, and the counter counts from 0 to $2^n-1$ in the signal phase, wherein m and n are positive integers, and m is less than or equal to n.

7. The DDS circuit of claim 1, wherein the clamp circuit comprises:
a clamp transistor that generates the clamp voltage at the image output node; and
a bias transistor connected between a power and the clamp transistor;
wherein the bias transistor and the clamp transistor are connected in series between a power and the image output node.

8. The DDS circuit of claim 7, wherein a gate of the clamp transistor is controlled by a clamp enable signal, and a gate of the second bias transistor is connected to a bias voltage.

9. The DDS circuit of claim 1, performing the following steps in sequence in the signal phase:
transferring image signal from a photodiode of the pixel circuit to a floating diffusion (FD) node of the pixel circuit; and
ramping down the ramp voltage while the counter counts, thereby generating the signal-ADC value.

10. The DDS circuit of claim 1, wherein the pixel circuit comprises:
a photodiode;
a transfer transistor connected between a floating diffusion (FD) node and the photodiode, a gate of the transfer transistor being connected to a transfer signal;
a reset transistor connected between a power and the FD node, a gate of the reset transistor being connected to a reset signal;
a source follower transistor; and
a row selection transistor, the source follower transistor and the row selection transistor being connected in series between the power and the image output node, gates of the source follower transistor and the row selection transistor being connected to the FD node and a selection signal, respectively.

11. The DDS circuit of claim 10, further comprising:
a bias transistor connected between the image output node and ground, a gate of the bias transistor being connected to a bias voltage.

* * * * *